United States Patent
Lee

(10) Patent No.: US 8,680,714 B2
(45) Date of Patent: Mar. 25, 2014

(54) SMART CARDS

(75) Inventor: Seung-Won Lee, Yongin-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 222 days.

(21) Appl. No.: 13/268,144

(22) Filed: Oct. 7, 2011

(65) Prior Publication Data

US 2012/0086282 A1    Apr. 12, 2012

(30) Foreign Application Priority Data

Oct. 8, 2010   (KR) .................. 10-2010-0098057

(51) Int. Cl.
*H02J 1/00*   (2006.01)

(52) U.S. Cl.
USPC ............................................. 307/82

(58) Field of Classification Search
USPC ............................................. 307/82
See application file for complete search history.

(56) References Cited

U.S. PATENT DOCUMENTS

| | | | | |
|---|---|---|---|---|
| 5,105,074 A | * | 4/1992 | Nara | 235/492 |
| 6,466,126 B2 | * | 10/2002 | Collins et al. | 340/333 |
| 2006/0113385 A1 | * | 6/2006 | Chan et al. | 235/440 |

FOREIGN PATENT DOCUMENTS

| | | |
|---|---|---|
| JP | 2005191961 A | 7/2005 |
| JP | 2005268768 A | 9/2005 |
| JP | 2007094954 A | 4/2007 |

* cited by examiner

*Primary Examiner* — Rexford Barnie
*Assistant Examiner* — Joseph Inge
(74) *Attorney, Agent, or Firm* — Harness, Dickey & Pierce, P.L.C.

(57) ABSTRACT

A smart card includes an internal voltage generator, a clock generator, and an internal circuit. The internal voltage generator generates a first internal voltage and a second internal voltage based on an input voltage received through an antenna. A level of the second internal voltage is lower than a level of the first internal voltage. The clock generator receives the first internal voltage and the second internal voltage to generate a clock signal. A frequency of the clock signal is changed according to the level of the first internal voltage. The internal circuit operates based on the clock signal and the second internal voltage.

17 Claims, 10 Drawing Sheets

210a

210b

SMART CARDS

CROSS-REFERENCE TO RELATED APPLICATION(S)

This application claims priority under 35 U.S.C. §119 to Korean Patent Application No. 10-2010-0098057, filed on Oct. 8, 2010, in the Korean Intellectual Property Office (KIPO), the entire contents of which are incorporated herein by reference.

BACKGROUND

1. Technical Field

Example embodiments relate generally to a semiconductor device. More particularly, example embodiments of inventive concepts relate to smart cards.

2. Description of the Related Art

Smart cards may be called chip cards or integrated (IC) cards. The smart cards can be divided into contact mode cards, contactless mode cards and mixed cards based on a method of using them.

Due to a receiving voltage in the contactless mode card, the performance may be affected when the current consumption is increased.

SUMMARY

At least some example embodiments provide a smart card capable of adaptively adjusting the frequency of the clock signal according to the current consumption.

According to at least some example embodiments, a smart card includes an internal voltage generator, a clock generator, and an internal circuit. The internal voltage generator generates a first internal voltage and a second internal voltage based on an input voltage. A level of the second internal voltage is lower than a level of the first internal voltage. The clock generator receives the first internal voltage and the second internal voltage to generate a clock signal, the clock generator configured to change a frequency of the clock signal according to the level of the first internal voltage. The internal circuit is configured to operate based on the clock signal and the second internal voltage.

In at least some example embodiments, the clock generator is configured to decrease the frequency of the clock signal until the level of the first internal voltage is equal to the level of the second internal voltage.

The clock generator is configured to maintain the frequency of the clock signal if the level of the first internal voltage is equal to the level of the second internal voltage.

In at least some example embodiments, the internal voltage generator may include a first internal voltage generating unit and a second internal voltage generating unit. The first internal voltage generating unit may generate the first internal voltage based on the input voltage and a reference voltage. The second internal voltage generating unit may generate the second internal voltage based on the first internal voltage and the reference voltage.

In at least some example embodiments, the first internal voltage generating unit may include a first comparator, a first p-type metal-oxide semiconductor (PMOS) transistor. The comparator is configured to compare a first voltage at a second node and the reference voltage. The first voltage is divided from the first internal voltage by a first resistor and a second resistor. The first resistor and a second resistor are connected in series between the first node and a ground voltage. The first PMOS transistor is connected between the input voltage and the first node. The first PMOS transistor has a gate that receives an output of the first comparator. The first node is configured to provide the first internal voltage.

In at least some example embodiments, the second internal voltage generating unit may include a second comparator, a n-type metal-oxide semiconductor (NMOS) transistor, a second PMOS transistor and a third comparator. The second comparator is configured to compare a second voltage at a third node and the reference voltage. The second voltage is divided from the first internal voltage by a third resistor and a fourth resistor. The third resistor and the fourth resistor are connected in series between the first node and the ground voltage. The NMOS transistor is connected between the first node and the ground voltage. The NMOS transistor has a gate configured to receive an output of the second comparator. The second PMOS transistor is connected between the first node and a fourth node. The third comparator is configured to compare a third voltage and the reference voltage. The third voltage is divided from the second internal voltage by a fifth resistor and a sixth resistor. The fifth resistor and the sixth resistor are connected in series between the fourth node and the ground voltage. An output of the third comparator is connected to the second PMOS transistor. The fourth node is configured to provide the second internal voltage.

In at least some example embodiments, the clock generator may include a control voltage generating unit, a first internal signal generating unit, a second internal signal generating unit and a clock generating unit. The control voltage generating unit is configured to provide a control voltage based on the first internal voltage. A level of the control voltage is lower than a level of the first internal voltage. The first internal signal generating unit is configured to provide a first internal signal based on the second internal voltage and the control voltage. The first internal signal has the level of the second internal voltage during a first half-period of the clock signal in response to the clock signal. The second internal signal generating unit is configured to provide a second internal signal based on the second internal voltage and the control voltage. The second internal signal has the level of the second internal voltage during a second half-period of the clock signal in response to an inverted clock signal. The inverted clock signal has a phase opposite to the clock signal. The clock generating unit is configured to generate the clock signal and the inverted clock signal in response to the first internal signal and the second internal signal.

The first internal signal generating unit is configured to decrease the first internal signal from the second internal voltage level to the control voltage level during the second half-period of the clock signal. The second internal signal generating unit is configured to decrease the second internal signal from the second internal voltage level to the control voltage level during the first half-period of the clock signal.

In at least some example embodiments, the control voltage generating unit may include a PMOS transistor, a first resistor, a second resistor and a NMOS transistor. The PMOS transistor is connected between the first internal voltage and a first node. The PMOS transistor has a gate connected to a ground voltage. The first resistor is connected to the first node. The second resistor is connected to the first resistor. The first resistor and the second resistor are connected in series between the first node and a second node. The NMOS transistor is connected between the second node and the ground voltage. A gate of the NMOS transistor is connected to the second node. The second node is configured to provide the control voltage.

In at least some example embodiments, the first internal signal generating unit may include a first NMOS transistor, a second NMOS transistor, a PMOS transistor and a capacitor. The first NMOS transistor is connected to a ground voltage. The NMOS transistor has a gate configured to receive the control voltage. The second NMOS transistor is connected to the first NMOS transistor. The PMOS transistor is connected to the second NMOS transistor. The second NMOS transistor and the PMOS transistor are connected at a node between the first NMOS transistor and the second internal voltage. The capacitor is connected between a node and the ground voltage. The gates of the second NMOS transistor and the PMOS transistor are configured to receive the clock signal. The node is configured to provide the first internal signal.

In at least some example embodiments, the second internal signal generating unit may include a first NMOS transistor, a second NMOS transistor, a PMOS transistor and a capacitor. The first NMOS transistor is connected to a ground voltage. The first NMOS transistor has a gate configured to receive the control voltage. The second NMOS transistor is connected to the first NMOS transistor. The PMOS transistor is connected to the second NMOS transistor. The second NMOS transistor and the PMOS transistor are connected at a node between the first NMOS transistor and the second internal voltage. The capacitor is connected between the node and the ground voltage. The gates of the second NMOS transistor and the PMOS transistor are configured to receive the inverted clock signal. The node is configured to provide the second internal signal.

The clock generating unit may include a first comparator, a second comparator, a first NAND gate and a second NAND gate. The first comparator is configured to compare the control signal and the first internal signal and provide a first comparison signal based on the comparison of the control signal and the first internal signal. The second comparator is configured to compare the control signal and the second internal signal and provide a second comparison signal based on the comparison of the control signal and the second internal signal. The first NAND gate is configured to perform a NAND-operation on the first comparison signal and the clock signal and provide the inverted clock signal. The second NAND gate is configured to perform a NAND-operation on the second comparison signal and the inverted clock signal and provide the clock signal.

According to at least some example embodiments, a smart card includes an internal voltage generator, a clock generator and an internal circuit. The internal voltage generator is configured to generate a first internal voltage and a second internal voltage. The first internal voltage is based on a contactless voltage in a contactless mode. A level of the second internal voltage is lower than a level of the first internal voltage in the contactless mode. The level of the second internal voltage is based on the contact voltage in a contact mode. The clock generator is configured to generate a clock signal. A frequency of the clock signal is based on the level of first internal voltage in the contactless mode. The frequency of the clock signal is based on the level of the second internal voltage in the contact mode. The internal circuit is configured to operate based on the clock signal and the internal voltage.

In at least some example embodiments, the internal voltage generator may include a mode decision unit, a first internal voltage generating unit, a contact voltage providing unit and a second internal voltage generating unit. The mode decision unit is configured to compare the contact voltage and the contactless voltage and generate a contactless enable signal based on the comparison of the contact voltage and the contactless voltage. The first internal voltage generating unit is configured to provide the first internal voltage based on the contactless enable signal. The contact voltage providing unit is configured to provide the contact voltage based on the contactless enable signal. The second internal voltage generating unit is configured to generate the second internal voltage. The second internal voltage is based on the first internal voltage in the contactless mode. The second internal voltage is based on the contact voltage in the contact mode.

In at least some example embodiments, the mode decision unit may include a comparator. The comparator is configured to generate the contactless enable signal. The contactless enable signal has a logic level based on comparing result of the contact voltage and the contactless voltage.

In at least some example embodiments, the contact voltage providing unit may include a PMOS transistor. The PMOS transistor has a gate configured to receive the contactless enable signal. The PMOS transistor is configured to adaptively provide the contact voltage to the second internal voltage generating unit in response to the contactless enable signal.

At least another example embodiment discloses a smart card including a voltage generator configured to generate first and second internal voltages based on an input voltage, a clock generator configured to generate a clock signal based on the first and second internal voltages, the clock generator being configured to decrease the frequency of the clock signal if the first internal voltage decreases, and an internal circuit configured to operate based on the clock signal and the second internal voltage.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF EXAMPLE EMBODIMENTS

Figure 1:
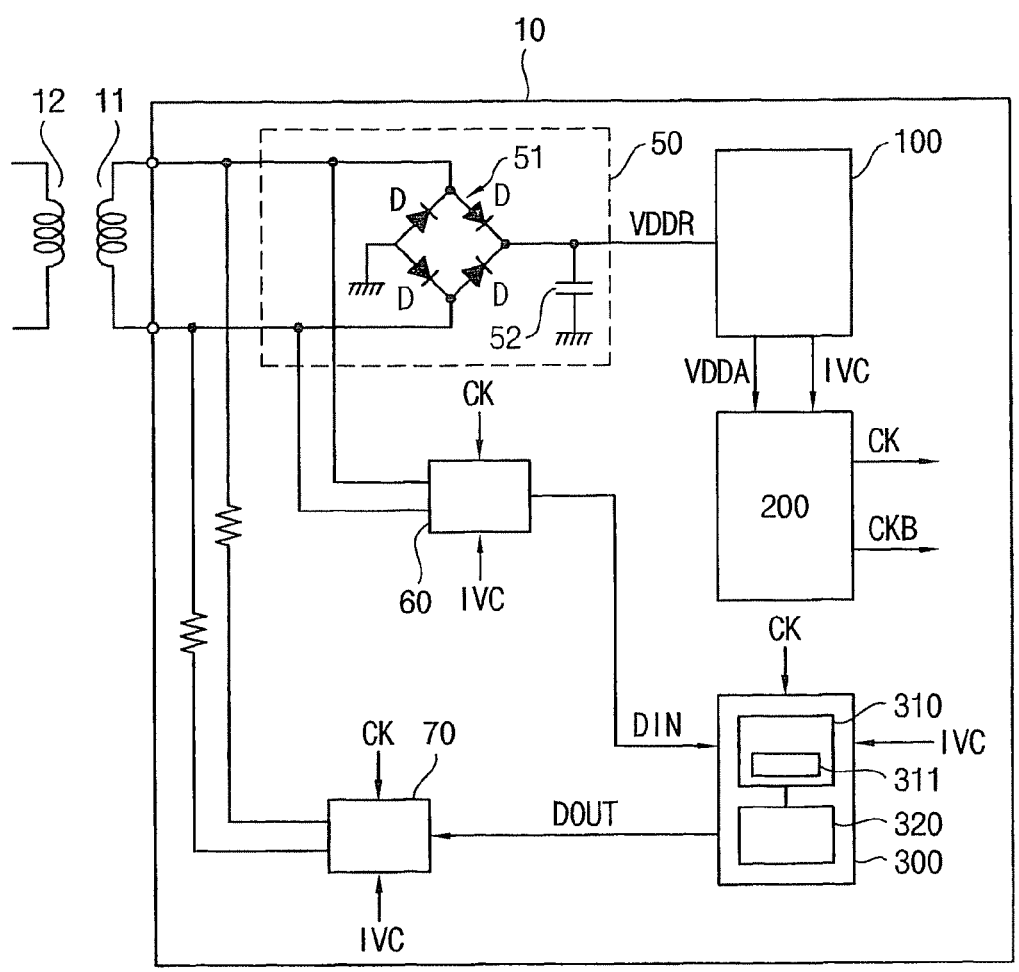
FIG. 1 is a block diagram illustrating a smart card according to at least some example embodiments.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of inventive concepts. As used herein, the singular forms "a," "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a smart card according to at least some example embodiments.

In FIG. 1, antennas 12, 11 are also illustrated together with the smart card 10 in FIG. 1. The antenna 11 may be referred to as a receiving coil and the antenna 12 may be referred to as a transmitting coil and is part of a read/write device.

Referring to FIG. 1, the smart card 10 is connected to the receiving coil 11, which is an antenna on the card's side. The receiving coil 11 may be coil-shaped on the card and be made from copper film. The structure and the material of the receiving coil 11 are not limited to the description above. The smart card 10 may include a rectifier circuit unit 50, a data receiving circuit 60, a data transmitting circuit 70, an internal voltage generator 100, a clock generator 200 and an internal circuit 300.

The rectifier circuit unit 50 may include a rectifier circuit 51 and a smoothing condenser 52. The rectifier circuit 51 may consist of four diodes forming a bridge, and the smoothing condenser 52 may be configured to smooth the rectified voltage of the rectifier circuit 51 to provide the smoothed voltage for an input voltage VDDR. The rectifier circuit 51 may rectify AC signal received by electromagnetic coupling of the receiving coil 11 and the transmitting coil 12 in the read/write device.

The data receiving circuit 60 may demodulate a data received from the read/write device to provide the demodulated data as an input data DIN for the internal circuit 300. In addition, the data transmitting circuit 70 may modulate an output data DOUT received from the internal circuit 300 to provide the modulated data for the read/write device through the receiving coil 11.

The internal voltage generator 100 may generate a first internal voltage VDDA and a second internal voltage IVC based on the input voltage VDDR. The level of the second internal voltage IVC may be lower than the level of the first internal voltage VDDA. The second internal voltage IVC is provided for the data receiving circuit 60, the data transmitting circuit 70 and the internal circuit 300 to be used as an operation voltage.

The clock generator 200 may receive the first internal voltage VDDA and the second internal voltage IVC to generate a clock signal CK and an inverted clock signal CKB. The frequencies of the clock signal CK and the inverted clock signal CKB are changed according to the level of the first internal voltage VDDA. The phase of the inverted clock signal CKB may be opposite to the phase of the clock signal CK. The clock signal CK may be provided for the data receiving circuit 60, the data transmitting circuit 70 and the internal circuit to be used for operation sequence controls or signal/data transmissions.

The internal circuit 300 may include a logic circuit 310 and a non-volatile memory 320. The logic circuit 310 may include a random number generator 311. When the input data DIN is received or the output data DOUT is transmitted, the logic circuit 310 may use the random number generator 311 for encryption.

Figure 2:
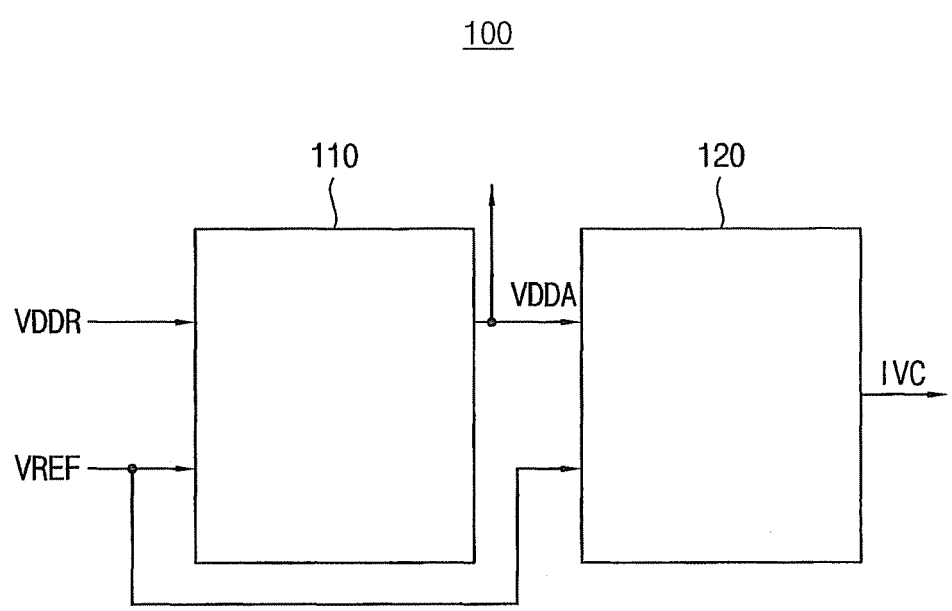
FIG. 2 is a block diagram illustrating an example of an internal voltage generator in FIG. 1 according to at least some example embodiments.

FIG. 2 is a block diagram illustrating an example of the internal voltage generator in FIG. 1 according to some example embodiments.

Referring to FIG. 2, the internal voltage generator 100 includes a first internal voltage generating unit 110 and the second voltage generating unit 120. The first internal voltage generating unit 110 may generate the first internal voltage VDDA based on the input voltage VDDR and a reference voltage VREF. The second internal voltage generating unit 120 may generate the second internal voltage IVC, whose voltage level is lower than the level of the first internal voltage VDDA, based on the first internal voltage VDDA and the reference voltage VREF.

Figure 3:
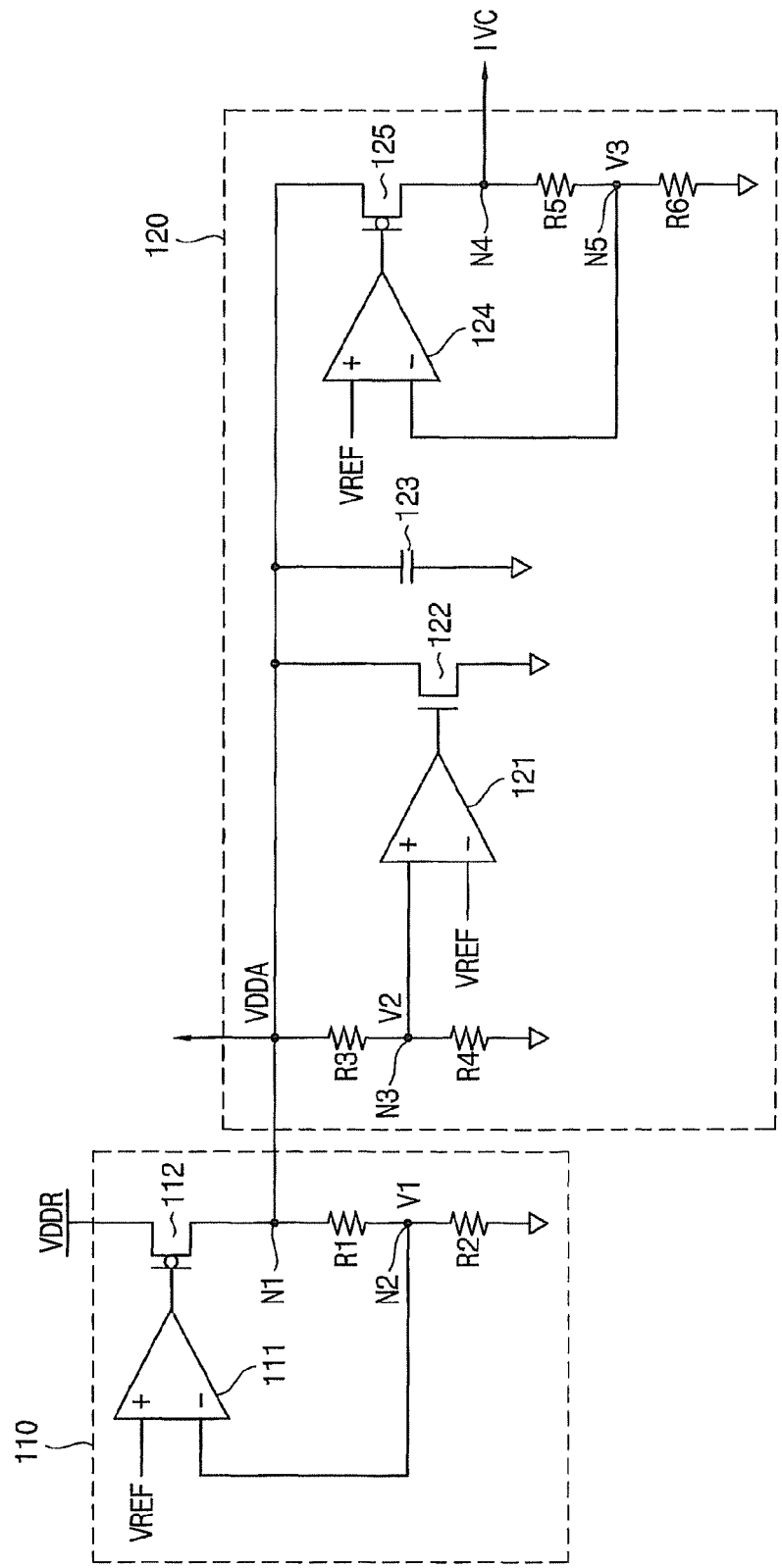
FIG. 3 is a circuit diagram illustrating an example of the internal voltage generator of FIG. 2 according to at least some example embodiments.

FIG. 3 is a circuit diagram illustrating an example of the internal voltage generator of FIG. 2 according to some example embodiments.

Referring to FIG. 3, the first internal voltage generating unit 110 includes a first comparator 111, a p-type metal-oxide semiconductor (PMOS) transistor 112 and resistors R1, R2.

The PMOS transistor 112 may include a source connected to the input voltage VDDR, a drain connected to a first node N1, and a gate connected to the output of the first comparator 111. The resistors R1 and R2 may be connected in series between the first node N1 and the ground voltage. A second node N2, where the resistors are connected to each other, may be connected to a negative input of the first comparator 111. The first internal voltage VDDA may be provided from the first node N1. In addition, a positive input of the first comparator 111 may be connected to the reference voltage VREF. When the voltage level of the second node N2 is termed a first voltage V1, the relationship between the first voltage V1 and the first internal voltage VDDA may be represented as the following [Expression 1].

$$V1=VDDA*R2/(R1+R2) \quad \text{[Expression 1]}$$

Therefore, the first internal voltage VDDA, which is voltage of the first node N1, may be changed according to the difference between the reference voltage VREF and the first voltage V1.

The second internal voltage generating unit 120 may include resistors R3, R4, a second comparator 121, an n-type metal-oxide semiconductor (NMOS) transistor 122, a capacitor 123, a third comparator 124, a PMOS transistor 125 and resistors R5, R6.

The resistors R3 and R4 are connected in series between the first node N1 and a ground voltage. The resistors R3 and R4 are connected to each other at a third node N3. When the voltage level of the third node N3 is termed a second voltage V2, the relationship between the second voltage V2 and the first internal voltage VDDA may be represented as the following [Expression 2].

$$V2=VDDA*R4/(R3+R4) \quad \text{[Expression 2]}$$

A positive input of the second comparator 121 may be connected to the second voltage V2, and a negative input of the second comparator 121 may be connected to the reference voltage VREF. A drain of the NMOS transistor 122 may be connected to the first node N1 to receive the first internal voltage VDDA, and a gate of the NMOS transistor 122 may be connected to the output node of the second comparator 121. A source of the NMOS transistor 122 may be connected to the ground voltage. The capacitor 123 may be connected between the first node N1 and the ground voltage to be charged by the first internal voltage VDDA. The PMOS transistor 125 may have a source connected to the first node N1, a drain connected to a fourth node N4, and a gate connected to an output node of the third comparator 124. The second internal voltage IVC is provided from the fourth node N4. The resistors R5 and R6 are connected in series between the fourth node N4 and the ground voltage. The resistors R5 and R6 are connected to each other at a fifth node N5. A positive input of the third comparator 124 is connected to the reference voltage VREF and a negative input of the third comparator 124 is connected to the fifth node N5. When the voltage level of the fifth node is termed a third voltage V3, the relationship between the second internal voltage IVC and the third voltage V3 may be represented as the following [Expression 3].

$$V3=IVC*R6/(R5+R6) \quad \text{[Expression 3]}$$

Therefore, the second internal voltage IVC may be determined according to the difference between the reference voltage VREF and the third voltage V3. In at least some example embodiments, the level of the second internal voltage IVC may be half of the level of the first internal voltage VDDA. In at least some example embodiments, the resistors R1, R2, R3, R4, R5 and R6 may have different resistances each other.

When the first internal voltage VDDA is increased too high, the NMOS transistor 122 may be turned on in response to the output of the second comparator 121, to sink a certain level of the first internal voltage VDDA to the ground voltage. When the first internal voltage VDDA is decreased too low, the NMOS transistor 122 may be turned off in response to the output of the second comparator 121, to block off a path to the ground voltage. In other words, when the current consumed in the logic circuit 310 of FIG. 1 is small during the normal operation of the logic circuit 310, the NMOS transistor 122 may be turned on and the path to the ground voltage may be connected. When the current consumed in the logic circuit 310 is large during the encryption of the logic circuit 310, the NMOS transistor 122 may be turned off and the path to the ground voltage may be disconnected.

Figure 4:
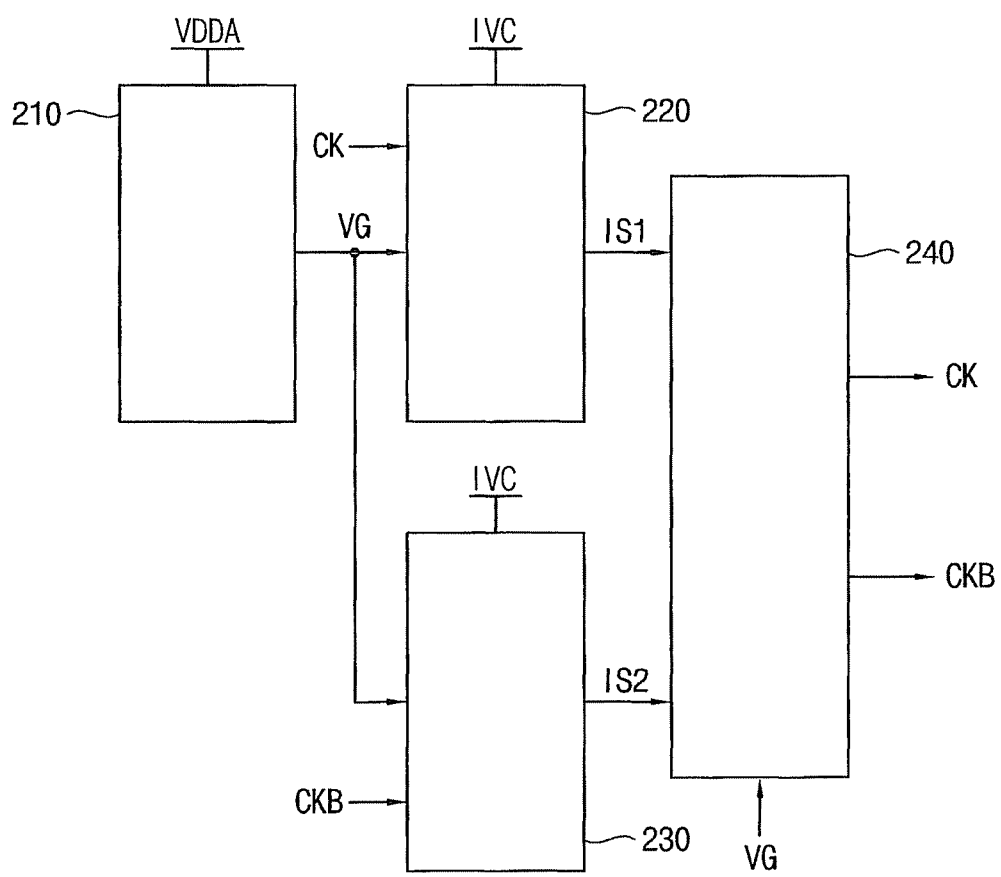
FIG. 4 is a block diagram illustrating an example of a clock generator in FIG. 1 according to at least some example embodiments.

FIG. 4 is a block diagram illustrating an example of the clock generator in FIG. 1 according to at least some example embodiments.

Referring to FIG. 4, the clock generator 200 includes a control voltage generating unit 210, a first internal signal generating unit 220, a second internal signal generating unit 230 and a clock generating unit 240.

The control voltage generating unit 210 may receive the first internal voltage VDDA to generate a control voltage VG. The level of the control voltage VG may be lower than the level of the first internal voltage VDDA. The first internal signal generating unit 220 may receive the second internal voltage IVC and the control voltage VG. The first internal signal generating unit 220 may provide a first internal signal IS1 in response to the clock signal CK. The first internal signal IS1 may have the level of the second internal voltage IVC during a first half period of the clock signal CK. The second internal, signal generating unit 230 may receive the second internal voltage IVC and the control voltage VG. The second internal signal generating unit 230 may provide a second internal signal IS2 in response to the inverted clock signal CKB. The second internal signal IS2 may have the level of the second internal voltage IVC during a second half period of the clock signal CK. The clock generating unit 240 may generate the clock signal CK and the inverted clock signal CKB in response to the first internal signal IS1 and the second internal signal IS2.

Figure 5:
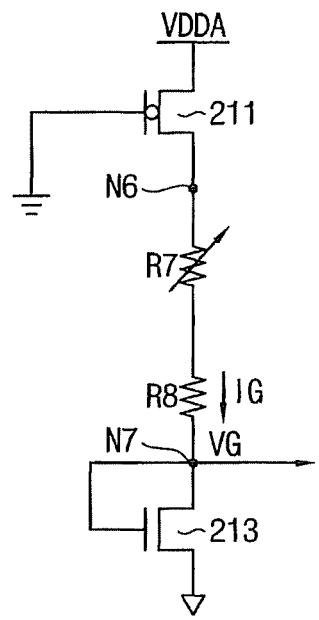
FIG. 5 is a circuit diagram illustrating an example of a control voltage generating unit in FIG. 4 according to at least some example embodiments.

FIG. 5 is a circuit diagram illustrating an example of the control voltage generating unit in FIG. 4 according to at least some example embodiments.

Referring to FIG. 5, a control voltage generating unit 210a includes a PMOS transistor 211, a variable resistor R7, a resistor R8 and NMOS transistor 213. The PMOS transistor 211 may include a source connected to the first internal voltage VDDA, a drain connected to a node N6, and a gate connected to the ground voltage. The variable resistor R7 and the resistor R8 are connected in series between the node N6 and a node N7. The NMOS transistor 213 may include a drain and a gate, which are connected to the node N7, and a source connected to the ground voltage. Since the gate and the drain are connected to each other, the NMOS transistor 213 is a diode-connected transistor. Therefore, the current to the ground voltage is not flow. Considering a current IG flowing through the variable resistor R7 and the resistor R8, the relationship between the current IG resistors R7, R8, the first internal voltage VDDA and the control voltage VG may represented as the following [Expression 4].

$$IG=(VDDA-VG)/(R7+R8) \quad \text{[Expression 4]}$$

Figure 6:
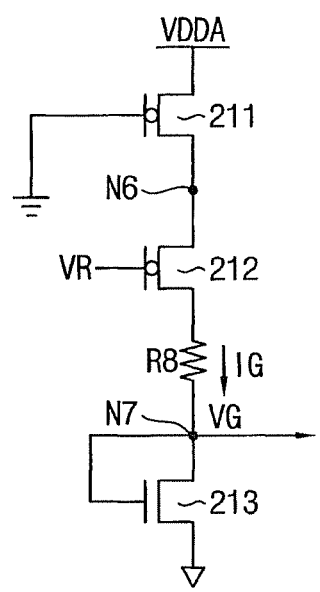
FIG. 6 is a circuit diagram illustrating another example of the control voltage generating unit in FIG. 4 according to at least some example embodiments.

FIG. 6 is a circuit diagram illustrating another example of the control voltage generating unit in FIG. 4 according to at least some example embodiments.

Referring to FIG. 6, a control voltage generating unit 210b includes a PMOS transistor 212 that is substituted for the variable resistor R7 in FIG. 5. Bias voltage VR is applied to the gate of the PMOS transistor 212. The PMOS transistor 212 operates like a variable resistor according to the bias voltage VR. When the resistance of the PMOS transistor 212 is substantially equal to the resistor R7, it is possible to apply [Expression 4] to FIG. 6.

Figure 7:
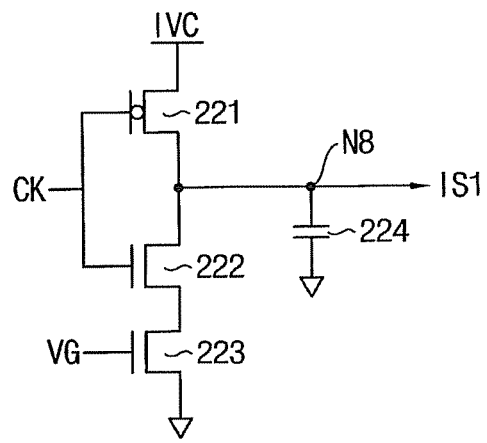
FIG. 7 is a circuit diagram illustrating an example of a first internal signal generating unit in FIG. 4 according to at least some example embodiments.

FIG. 7 is a circuit diagram illustrating an example of the first internal signal generating unit in FIG. 4 according to at least some example embodiments.

Referring to FIG. 7, the first internal signal generating unit 220 includes a PMOS transistor 221, NMOS transistors 222, 223, and a capacitor 224. The PMOS transistor 221 may have a source connected to the second internal voltage IVC and a drain connected to a drain of the NMOS transistor 222 at a node N8. The clock signal CK is provided to the gates of the PMOS transistor 221 and NMOS transistor 222. The drain of the NMOS transistor 223 is connected to the source of the NMOS transistor 222. The source of the NMOS transistor 223 is connected to the ground voltage. The control voltage VG is provided to the gate of the NMOS transistor 223. The capacitor 224 is connected between the node N8 and the ground voltage to store the voltage of node N8. The first internal signal IS1 is provided at the node N8.

Figure 8:
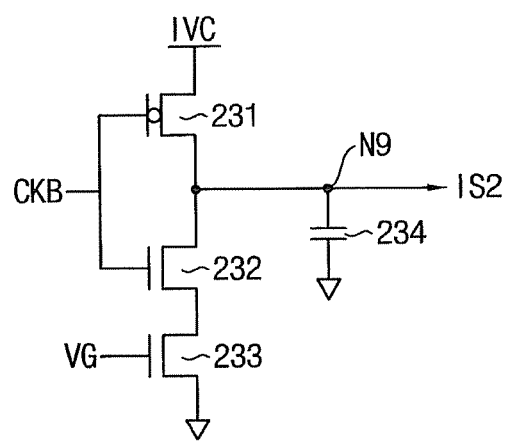
FIG. 8 is a circuit diagram illustrating an example of a second internal signal generating unit in FIG. 4 according to at least some example embodiments.

FIG. 8 is a circuit diagram illustrating an example of the second internal signal generating unit in FIG. 4 according to at least some example embodiments.

Referring to FIG. 8, the second internal signal generating unit 230 includes a PMOS transistor 231, NMOS transistors 232, 233, and a capacitor 234. The PMOS transistor 231 may have a source connected to the second internal voltage IVC, a drain connected to a drain of the NMOS transistor 232 at a node N9. The inverted clock signal CKB is provided to the gates of the PMOS transistor 231 and NMOS transistor 232. The drain of the NMOS transistor 233 is connected to the source of the NMOS transistor 232. The source of the NMOS transistor 233 is connected to the ground voltage. The control voltage VG is provided to the gate of the NMOS transistor 233. The capacitor 234 is connected between the node N9 and the ground voltage to store the voltage of the node N9. The second internal signal IS2 is provided at the node N9. The capacitors 224, 234 may have substantially a same capacitance.

Figure 9:
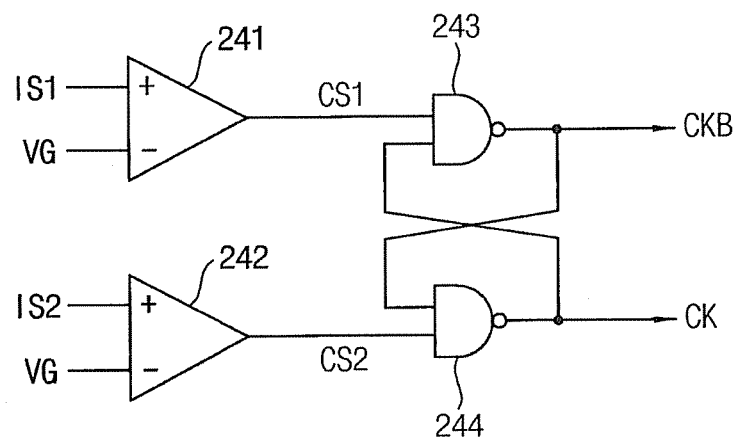
FIG. 9 is a circuit diagram illustrating an example of a clock generating unit in FIG. 4 according to at least some example embodiments.

FIG. 9 is a circuit diagram illustrating an example of the clock generating unit in FIG. 4 according to at least some example embodiments.

Referring to FIG. 9, a clock generating unit 240a includes comparators 241, 242 and NAND gates 243, 244. The first internal signal IS1 is provided to a positive input of the comparator 241 and the control voltage VG is provided to a negative input of the comparator 241. The comparator 241 outputs a first comparison signal CS1. Since the level of the first internal signal IS1 is higher than the level of the control voltage VG the first comparison signal CS1 has a logic-high level. The second internal signal IS2 is provided to a positive input of the comparator 242 and a control voltage VG is provided to a negative input of the comparator 242. The comparator 242 outputs a second comparison signal CS2. Since the level of the second internal signal IS2 is higher than the level of the control voltage VG the second comparison signal CS2 has a logic-high level. The NAND gate 243 performs a NAND operation with respect to the first comparison signal CS1 and the clock signal CK to output the inverted clock signal CKB. The NAND gate 244 performs NAND operation with respect to the second comparison signal CS2 and the inverted clock signal CKB to output the clock signal CK. As a result, the clock signal CK and the inverted clock signal CKB may have frequencies which are opposite to each other.

Figure 10:
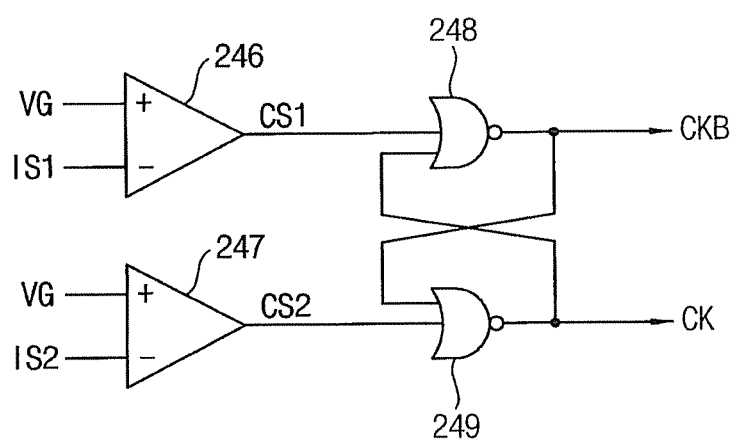
FIG. 10 is a circuit diagram illustrating another example of the clock generating unit in FIG. 4 according to at least some example embodiments.

FIG. 10 is a circuit diagram illustrating another example of the clock generating unit in FIG. 4 according to at least some example embodiments.

Referring to FIG. 10, a clock generating unit 240b includes comparators 246, 247 and NOR gates 248, 249. The first internal signal IS1 is provided to a negative input of the comparator 246 and the control voltage VG is provided to a positive input of the comparator 246. The comparator 246 outputs a first comparison signal CS1. Since the level of the first internal signal IS1 is higher than the level of the control voltage VG the first comparison signal CS1 has a logic-low level. The second internal signal IS2 is provided to a negative input of the comparator 247 and the control voltage VG is provided to a positive input of the comparator 247. The comparator 247 outputs the second comparison signal CS2. Since the level of the second internal signal IS2 is higher than the level of the control voltage VG the second comparison signal CS2 has a logic-low level. The NOR gate 248 performs NOR operation with respect to the first comparison signal CS1 and the clock signal CK to output the inverted clock signal CKB. The NOR gate 249 performs a NOR operation with respect to the second comparison signal CS2 and the inverted clock signal CKB to output the clock signal CK. As a result, the clock signal CK and the inverted clock signal CKB may have frequencies which are opposite to each other.

Figure 11:
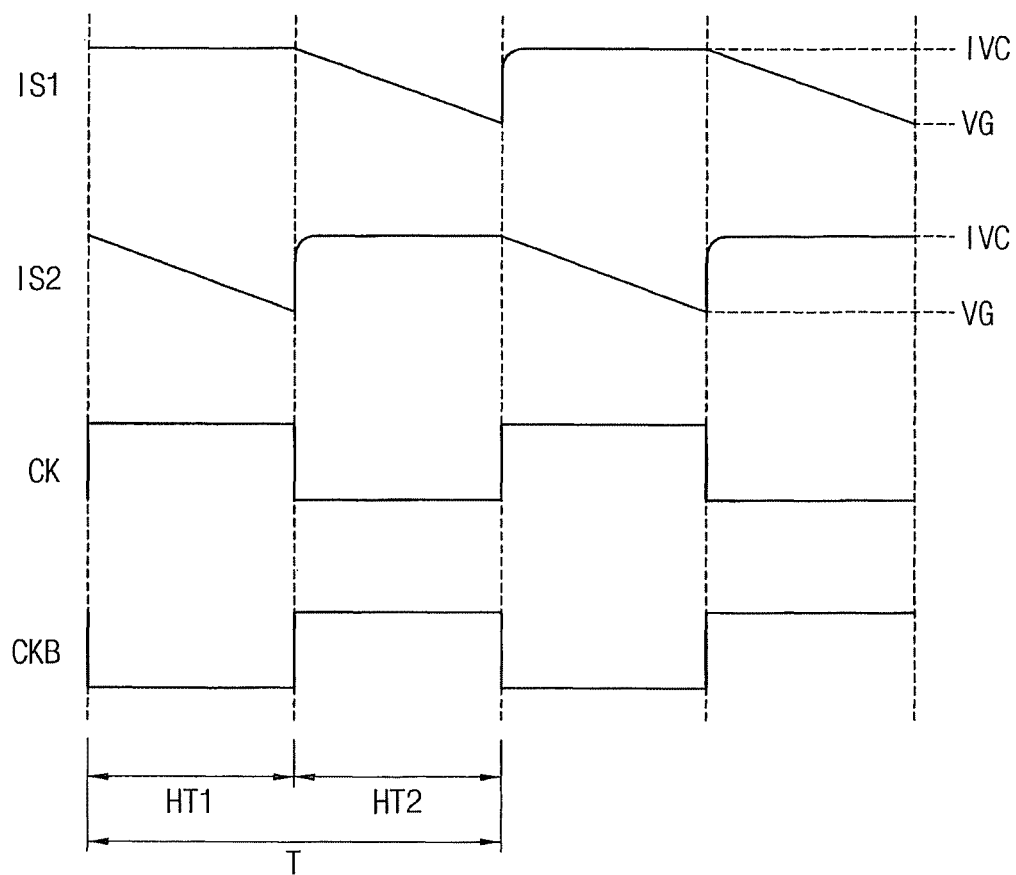
FIG. 11 is a timing diagram according to an example embodiment of the clock generator in FIG. 4.

FIG. 11 is a timing diagram illustrating the internal signals and the clock signals according to an example embodiment.

Referring to FIG. 11, the first internal signal and the second internal signal are charged or discharged with the clock signal's period or the inverted clock signal's period. In addition, the first internal signal IS1 and the second internal signal IS2 repeat charging or discharging of the capacitor with the voltage level between the second internal voltage IVC and the control voltage VG. Therefore, the relationship between the period T of the clock signal CK, the current IG and the capacitance C may be represented as the following [Expression 5].

$$T=(IVC-VG)*C/IG \qquad \text{[Expression 5]}$$

Using [Expression 4] for IG, [Expression 5] can be represented in another form as the following [Expression 6].

$$T=(IVC-VG)*(R7+R8)*C/(VDDA-VG) \qquad \text{[Expression 6]}$$

Therefore, the period of the clock signal CK is increased as the level of the first internal voltage VDDA is decreased. In addition, the period T of the clock signal CK may be adjusted by using the variable resistor R7. As a result, the clock generating unit 240 may generate the clock signal CK, whose frequency is changed according to the first internal voltage VDDA.

Referring to FIG. 11, the capacitor 224 is charged to the level of the second internal voltage IVC during a first half period HT1, and discharged to the level of the control voltage VG during a second half period HT2. The capacitor 234 is discharged to the level of the control voltage VG during a first half period HT1, and charged to the level of the second internal voltage IVC during a second half period HT2.

Referring to FIGS. 1 to 11, operation of the smart card according to example embodiments will be described below.

When operating in normal mode, the internal circuit 300 can bear the consumed current, which has the level of the first internal voltage VDDA based on the input voltage VDDR. When performing operations such as encryption which needs amount of current consumption, the level of the first internal voltage VDDA is decreased first, rather than the second internal voltage IVC. As the first internal voltage is decreased, the period T of the clock signal CK is increased, as seen in

[Expression 6]. In other words, frequency of the clock signal CK is decreased. Therefore, the internal circuit 300, which is synchronized with the clock signal, operates with lower frequency. The frequency of the clock signal CK and the level of the first internal voltage VDDA keep decreasing until the current provided for the internal circuit 300 and the current consumed in the internal circuit 300 are in equilibrium. When equilibrium between the provided current and the consumed current in the internal circuit 300 is achieved, the first internal voltage VDDA doesn't fall any more, and maintains its voltage level. At this point, a level the first internal voltage VDDA is the same as a level of the second internal voltage IVC. As a result, of the clock signal CK maintains a constant frequency.

Figure 12:
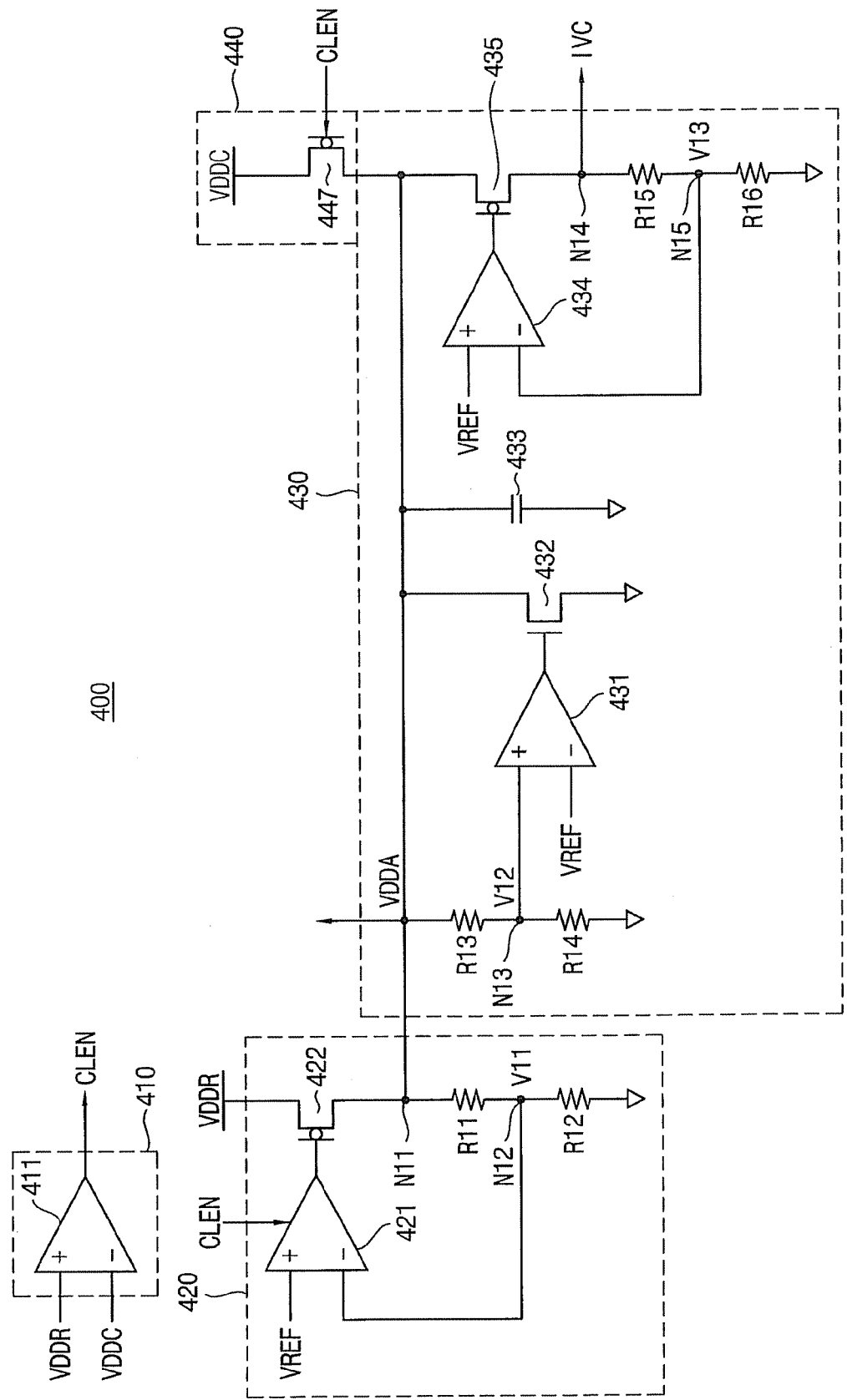
FIG. 12 is a block diagram illustrating an example of the internal voltage generator in FIG. 1 according to at least some example embodiments.

FIG. 12 is a block diagram illustrating an example of the internal voltage generator in FIG. 1 according to at least some example embodiments. The internal voltage generator is for the smart card 10 which operates in two modes, that is, contact mode and contactless mode.

Referring to FIG. 12, an internal voltage generator 400 includes a mode decision unit 410, a first internal voltage generating unit 420, a second internal voltage generating unit 430 and a contact voltage providing unit 440.

The mode decision unit 410 compares a contactless voltage (or, input voltage) VDDR and a contact voltage VDDC to output a contactless enable signal CLEN. When the contactless voltage VDDR is higher than the contact voltage VDDC, the contactless enable signal CLEN is activated to high level. When the contactless voltage VDDR is lower than the contact voltage VDDC, the contactless enable signal CLEN is deactivated to low level.

The first internal voltage generating unit 420 may include a first comparator 421, a PMOS transistor 422 and resistors R11, R12. The first comparator 421 is selectively activated in response to the contactless enable signal CLEN.

The PMOS transistor 422 may include a source connected to the contactless voltage VDDR, a drain connected to a node N11, and a gate connected to the output of the first comparator 421. The resistors R11 and R12 may be connected in series between the node N11 and the ground voltage. Voltage V11 at a node N12, where the resistors are connected to each other, may be connected to a negative input of the first comparator 421. When the contactless enable signal CLEN is activated, the first internal voltage VDDA may be provided from the first node N11. In addition, a positive input of the first comparator 421 may be connected to the reference voltage VREF.

The second internal voltage generating unit 430 may include resistors R13, R14, a second comparator 431, an NMOS transistor 432, a capacitor 433, a third comparator 434, a PMOS transistor 435 and resistors R15, R16.

The resistors R13 and R14 are connected in series between the node N11 and the ground voltage. The resistors R13 and R14 are connected to each other at a node N13. A positive input of the second comparator 431 may be connected to voltage V12, and a negative input of the second comparator 431 may be connected to the reference voltage VREF. A drain of the NMOS transistor 432 may be connected to the node N11, and a gate of the NMOS transistor 432 may be connected to the output node of the second comparator 431. A source of the NMOS transistor 432 may be connected to the ground voltage. The capacitor 433 may be connected between the first node N11 and the ground. The PMOS transistor 435 may have a source connected to the node N11, a drain connected to a node N14, and a gate connected to the output node of the third comparator 434. The second internal voltage IVC is provided from the node N14. The resistors R15 and R16 are connected in series between the node N14 and the ground voltage. The resistors R15 and R16 are connected to each other at a node N15. A positive input of the third comparator 434 is connected to the reference voltage VREF and a negative input of the third comparator 434 is connected to the node N5.

The contact voltage providing unit 440 may selectively provide the contact voltage VDDC in response to the contactless enable signal CLEN. The contact voltage providing unit 440 may include a PMOS transistor 447. A source of the PMOS transistor 447 is connected to the contact voltage VDDA, and a drain of the PMOS transistor 447 is connected to the node N11. The contactless enable signal CLEN is provided to a gate of the PMOS transistor 447. When the contactless enable signal CLEN is activated to high-level, the contact voltage VDDC is not provided to the node N11, and the first internal voltage is provided to the node N11. When the contactless enable signal CLEN is deactivated to low-level, the contact voltage VDDC is provided to the node N11. Therefore, when the contactless enable signal CLEN is activated to high-level, the clock generator 200 may generate the clock signal CK based on the first internal voltage VDDA and the second internal voltage IVC, as described above with reference to FIGS. 1 to 11. When the contactless enable signal CLEN is deactivated to low-level, the clock generator 200 may receive the second internal voltage IVC, which is based on the contact voltage VDDC, to generate the clock signal CK.

When the contactless enable signal CLEN is deactivated to low level, the contact voltage VDDC is provided to node N11. Therefore, the first internal voltage VDDA of the clock generator 200 in FIG. 4 may be substituted with the contact voltage VDDC.

According to at least some example embodiments, the smart card may adjust the frequency of the clock signal CK according to the level of the first internal voltage VDDA in contactless mode. In contact mode, the smart card may adjust the frequency of the clock signal CK according to the level of the contact voltage VDDC.

Figure 13:
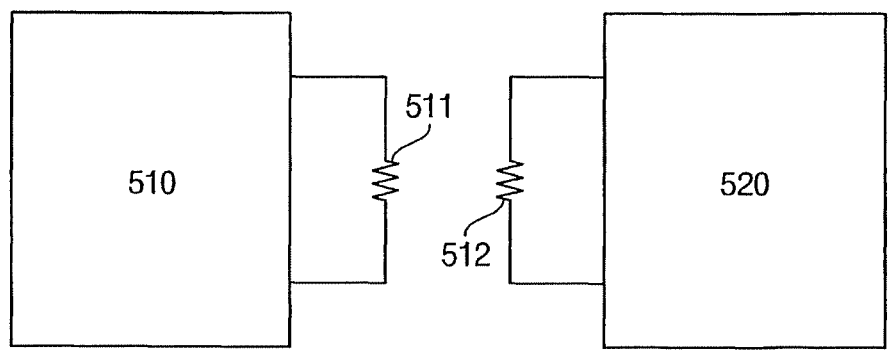
FIG. 13 is a block diagram illustrating a smart card system according to at least some example embodiments.

FIG. 13 is a block diagram illustrating a smart card system according to at least some example embodiments.

Referring to FIG. 13, a smart card system 500 includes a read/write device 510, a smart card 520, a first antenna 511 and a second antenna 512. The read/write device 510 and the smart card may exchange data through the first antenna 511 and the second antenna 512. The smart card 520 may accept a receiving voltage from the first antenna 511 through the second antenna 512. The smart card 520 may include the smart card 10 of FIG. 1. When the smart card 10 of FIG. 1 includes the internal voltage generator 100 in FIG. 3, the smart card system 500 may operate in contactless mode. When the smart card 10 of FIG. 1 includes the internal voltage generator 400 in FIG. 12, the smart card system 500 may operate in contact mode or contactless mode.

As described above, a smart card according to example embodiments adaptively adjusts a frequency of the clock signal, according to the current level consumed in the internal circuit. Therefore, the performance of the smart card may be enhanced.

According to example embodiments, frequency of the clock signal can be adaptively adjusted based on the current consumption in the internal circuit. Therefore, the smart card can be used in various applications such as SIM cards.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A smart card comprising:
an internal voltage generator configured to generate a first internal voltage and a second internal voltage based on an input voltage, a level of the second internal voltage being lower than a level of the first internal voltage;
a clock generator configured to receive the first internal voltage and the second internal voltage to generate a clock signal, the clock generator configured to change a frequency of the clock signal according to the level of the first internal voltage; and
an internal circuit configured to operate based on the clock signal and the second internal voltage, wherein the clock generator includes,
a control voltage generating unit configured to provide a control voltage based on the first internal voltage, a level of the control voltage being lower than the level of the first internal voltage,
a first internal signal generating unit configured to provide a first internal signal based on the second internal voltage and the control voltage, a level of the first internal signal having the level of the second internal voltage during a first half-period of the clock signal in response to the clock signal,
a second internal signal generating unit configured to provide a second internal signal based on the second internal voltage and the control voltage, a level of the second internal signal having the level of the second internal voltage during a second half-period of the clock signal in response to an inverted clock signal, the inverted clock signal having a phase opposite to a phase of the clock signal, and
a clock generating unit configured to generate the clock signal and the inverted clock signal in response to the first internal signal and the second internal signal.

2. The smart card of claim 1, wherein the clock generator is configured to decrease the frequency of the clock signal until the level of the first internal voltage is equal to the level of the second internal voltage.

3. The smart card of claim 2, wherein the clock generator is configured to maintain the frequency of the clock signal if the level of the first internal voltage is equal to the level of the second internal voltage.

4. The smart card of claim 1, wherein the internal voltage generator comprises:
a first internal voltage generating unit configured to generate the first internal voltage based on the input voltage and a reference voltage; and
a second internal voltage generating unit configured to generate the second internal voltage based on the first internal voltage and the reference voltage.

5. The smart card of claim 4, wherein the first internal voltage generating unit comprises:
a first comparator configured to compare a first voltage of a second node and the reference voltage;
a first resistor and a second resistor being connected in series between a first node and a ground voltage, the first resistor and the second resistor configured to divide the first voltage from the first internal voltage; and
a first p-type metal-oxide semiconductor (PMOS) transistor connected between the input voltage and the first node, the first PMOS transistor having a gate configured to receive an output of the first comparator,
wherein the first node is configured to provide the first internal voltage.

6. The smart card of claim 5, wherein the second internal voltage generating unit comprises:
a second comparator configured to compare a second voltage at a third node and the reference voltage;
a third resistor and a fourth resistor being connected in series between the first node and the ground voltage, the third resistor and the fourth resistor configured to divide the second voltage being divided from the first internal voltage;
a n-type metal-oxide semiconductor (NMOS) transistor connected between the first node and the ground voltage, the NMOS transistor having a gate configured to receive an output of the second comparator;
a second PMOS transistor connected between the first node and a fourth node;
a third comparator configured to compare a third voltage and the reference voltage, an output of the third comparator being connected to the second PMOS transistor; and
a fifth resistor and a sixth resistor being connected in series between the fourth node and the ground voltage, the fifth and sixth resistor configured to divide the third voltage from the second internal voltage,
wherein the fourth node is configured to provide the second internal voltage.

7. The smart card of claim 1, wherein the first internal signal generating unit is configured to decrease the level of the first internal signal from the second internal voltage level to the control voltage level during the second half-period of the clock signal, and the second internal signal generating unit is configured to decrease the level of the second internal signal from the second internal voltage level to the control voltage level during the first half-period of the clock signal.

8. The smart card of claim 1, wherein the control voltage generating unit comprises:
a PMOS transistor connected between the first internal voltage and a first node, the PMOS transistor having a gate connected to a ground voltage;
a first resistor connected to the first node;
a second resistor connected to the first resistor, the first resistor and the second resistor being connected in series between the first node and a second node; and
a NMOS transistor connected between the second node and the ground voltage,
wherein a gate of the NMOS transistor is connected to the second node, and the second node is configured to provide the control voltage.

9. The smart card of claim 1, wherein the first internal signal generating unit comprises:
a first NMOS transistor connected to a ground voltage, the first NMOS transistor having a gate configured to receive the control voltage;
a second NMOS transistor connected to the first NMOS transistor;
a PMOS transistor connected to the second NMOS transistor, the second NMOS transistor and the PMOS transistor being connected at a node between the first NMOS transistor and the second internal voltage; and a capacitor connected between the node and the ground voltage, wherein the gate of the second NMOS transistor and a gate of the PMOS transistor are configured to receive the clock signal, and the node is configured to provide the first internal signal.

10. The smart card of claim 1, wherein the second internal signal generating unit comprises:

a first NMOS transistor connected to a ground voltage, the first NMOS transistor having a gate configured to receive the control voltage;

a second NMOS transistor connected to the first NMOS transistor;

a PMOS transistor connected to the second NMOS transistor, the second NMOS transistor and the PMOS transistor being connected at a node between the first NMOS transistor and the second internal voltage; and a capacitor connected between the node and the ground voltage, wherein the gate of the second NMOS transistor and a gate of the PMOS transistor are configured to receive the inverted clock signal, and the node is configured to provide the second internal signal.

11. The smart card of claim 1, wherein the clock generating unit comprises:

a first comparator configured to compare the control signal and the first internal signal and provide a first comparison signal based on the comparison of the control signal and the first internal signal;

a second comparator configured to compare the control signal and the second internal signal and provide a second comparison signal based on the comparison of the control signal and the second internal signal;

a first NAND gate configured to perform a NAND-operation on the first comparison signal and the clock signal and provide the inverted clock signal; and a second NAND gate configured to perform a NAND-operation on the second comparison signal and the inverted clock signal and provide the clock signal.

12. A smart card comprising:

an internal voltage generator configured to generate a first internal voltage and a second internal voltage, the first internal voltage being based on a contactless voltage in a contactless mode, a level of the second internal voltage being lower than a level of the first internal voltage in the contactless mode, the level of the second internal voltage being based on a contact voltage in a contact mode;

a clock generator configured to generate a clock signal, a frequency of the clock signal being based on the level of first internal voltage in the contactless mode, the frequency of the clock signal being based on the level of the second internal voltage in the contact mode; and an internal circuit configured to operate based on the clock signal and the internal voltage, wherein the clock generator includes, a control voltage generating unit configured to provide a control voltage based on the first internal voltage, a level of the control voltage being lower than the level of the first internal voltage, a first internal signal generating unit configured to provide a first internal signal based on the second internal voltage and the control voltage, a level of the first internal signal having the level of the second internal voltage during a first half-period of the clock signal in response to the clock signal, a second internal signal generating unit configured to provide a second internal signal based on the second internal voltage and the control voltage, a level of the second internal signal having the level of the second internal voltage during a second half-period of the clock signal in response to an inverted clock signal, the inverted clock signal having a phase opposite to a phase of the clock signal, and a clock generating unit configured to generate the clock signal and the inverted clock signal in response to the first internal signal and the second internal signal.

13. The smart card of claim 12, wherein the internal voltage generator comprises:

a mode decision unit configured to compare the contact voltage and the contactless voltage and generate a contactless enable signal based on the comparison of the contact voltage and the contactless voltage;

a first internal voltage generating unit configured to provide the first internal voltage based on the contactless enable signal;

a contact voltage providing unit configured to provide the contact voltage based on the contactless enable signal; and a second internal voltage generating unit configured to generate the second internal voltage based on the first internal voltage in the contactless mode and based on the contact voltage in the contact mode.

14. The smart card of claim 13, wherein the mode decision unit comprises:

a comparator configured to compare the contact voltage and the contactless voltage and generate the contactless enable signal based on comparing the contact voltage and the contactless voltage.

15. The smart card of claim 13, wherein the contact voltage providing unit comprises:

a PMOS transistor having a gate configured to receive the contactless enable signal, the PMOS transistor configured to adaptively provide the contact voltage to the second internal voltage generating unit in response to the contactless enable signal.

16. A smart card comprising:

a voltage generator configured to generate first and second internal voltages based on an input voltage;

a clock generator configured to generate a clock signal based on the first and second internal voltages, the clock generator being configured to decrease the frequency of the clock signal if the first internal voltage decreases; and an internal circuit configured to operate based on the clock signal and the second internal voltage, wherein the clock generator includes, a control voltage generating unit configured to provide a control voltage based on the first internal voltage, a level of the control voltage being lower than the level of the first internal voltage, a first internal signal generating unit configured to provide a first internal signal based on the second internal voltage and the control voltage, a level of the first internal signal having the level of the second internal voltage during a first half-period of the clock signal in response to the clock signal, a second internal signal generating unit configured to provide a second internal signal based on the second internal voltage and the control voltage, a level of the second internal signal having the level of the second internal voltage during a second half-period of the clock signal in response to an inverted clock signal, the inverted clock signal having a phase opposite to a phase of the clock signal, and a clock generating unit configured to generate the clock signal and the inverted clock signal in response to the first internal signal and the second internal signal.

17. The smart card of claim 16, wherein the clock generator is configured to decrease the frequency of the clock signal if the internal circuit is in an encryption mode.

* * * * *